United States Patent
Low

(10) Patent No.: US 8,995,074 B1
(45) Date of Patent: Mar. 31, 2015

(54) READ CHANNEL OPTIMIZATION USING EVOLUTIONARY ALGORITHMS

(75) Inventor: Seo-How Low, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 391 days.

(21) Appl. No.: 13/409,840

(22) Filed: Mar. 1, 2012

Related U.S. Application Data

(60) Provisional application No. 61/448,507, filed on Mar. 2, 2011, provisional application No. 61/559,601, filed on Nov. 14, 2011.

(51) Int. Cl.
  *G11B 5/09* (2006.01)
  *G11B 5/02* (2006.01)

(52) U.S. Cl.
  CPC .................................. *G11B 5/02* (2013.01)
  USPC ............................................... 360/53

(58) Field of Classification Search
  USPC ......... 369/59.21, 53.35, 59.22; 714/795, 799, 714/798; 360/46, 66, 65, 53, 54, 67
  See application file for complete search history.

(56) References Cited

U.S. PATENT DOCUMENTS

| | | | |
|---|---|---|---|
| 7,191,083 B2 * | 3/2007 | Ashley et al. | 702/107 |
| 7,298,683 B2 * | 11/2007 | Baba | 369/59.22 |
| 7,428,203 B2 * | 9/2008 | Kashihara et al. | 369/53.35 |
| 2002/0057508 A1 * | 5/2002 | Seng et al. | 360/46 |
| 2004/0257954 A1 * | 12/2004 | Ohkubo et al. | 369/59.21 |

OTHER PUBLICATIONS

Tsai, Jinn-Tsong et al., "Hybrid Taguchi-Genetic Algorithm for Global Numerical Optimization", *IEEE Trans on Evolutionary Computation*, vol. 8, No. 4, Aug. 2004, pp. 365-377.

* cited by examiner

*Primary Examiner* — Nabil Hindi

(57) ABSTRACT

The present disclosure includes systems and techniques relating to the use of evolutionary algorithms for tuning the performance of read channels. Instructions encoded on a medium are performed by processor cause a storage device to perform operations including obtaining values corresponding to operating parameters of a read channel of the storage device, generating one or more output parameters corresponding to use of the values with the read channel, selecting a proper subset of the values based on the one or more output parameters and a cost function, creating a new generation of the values corresponding to the operating parameters based on the proper subset and repeating the generating and the selecting using the new generation of the values until a target is achieved, and outputting two or more of the values of the proper subset of a last generation, when the target is achieved to configure the read channel.

22 Claims, 8 Drawing Sheets

500

| | 502 | 504 | 506 | 508 |
|---|---|---|---|---|
| | Parameter | Level 1 | Level 2 | Level 3 |
| 520 | 1 | 2.2 | 15.3 | 32.8 |
| 522 | 2 | 67.4 | 75.3 | 99.2 |
| 524 | 3 | 0.2 | 0.5 | 0.7 |

| | | 534 | 536 | 538 |
|---|---|---|---|---|
| | Test Case | Parameter 1 | Parameter 2 | Parameter 3 |
| | 1 | 1 | 1 | 1 |
| | 2 | 1 | 2 | 2 |
| | 3 | 1 | 3 | 3 |
| 532 | 4 | 2 | 1 | 3 |
| | 5 | 2 | 2 | 1 |
| | 6 | 2 | 3 | 2 |
| | 7 | 3 | 1 | 2 |
| | 8 | 3 | 2 | 1 |
| | 9 | 3 | 3 | 3 |

| | Test Case | Parameter 1 | Parameter 2 | Parameter 3 |
|---|---|---|---|---|
| | 1 | 2.2 | 67.4 | 0.2 |
| 532 | 2 | 2.2 | 75.3 | 0.5 |
| | ... | ... | ... | ... |
| | 9 | 32.8 | 99.2 | 0.7 |

FIG. 5C

READ CHANNEL OPTIMIZATION USING EVOLUTIONARY ALGORITHMS

CROSS REFERENCE TO RELATED APPLICATIONS

This application claims the benefit of the priority of U.S. Provisional Application Ser. No. 61/448,507, filed Mar. 2, 2011 and entitled "READ CHANNEL OPTIMIZATION USING EVOLUTIONARY ALGORITHMS" and of U.S. Provisional Application Ser. No. 61/559,601, filed Nov. 14, 2011 and entitled "READ CHANNEL OPTIMIZATION USING EVOLUTIONARY ALGORITHMS", and both of these priority applications are hereby incorporated by reference in their entireties.

BACKGROUND

The present disclosure describes systems and techniques relating to the configuration of a read channel for a magnetic storage medium.

Signal processing circuits, also called read channels, are frequently used to read storage media and interpret obtained analog signals as discrete values stored on the media. For magnetic storage media, a transducer head may fly on a cushion of air over a magnetic disk surface. The transducer converts magnetic field variations into an analog electrical signal. The analog signal is amplified, converted to a digital signal and interpreted (e.g., using maximum likelihood techniques, such as using a Viterbi detector). Tracking of stored data during a read operation is frequently performed using feedback or decision aided gain and timing control. Additionally, perpendicular magnetic recording techniques can be used to increase the amount of data stored on a magnetic medium.

Various factors can affect the performance of read channels, such as per-unit variability introduced during the manufacturing process or the particular application to which a read channel is applied. The performance of read channels can be evaluated in terms of bit error rates (BER), sector failure rates (SFR), signal to noise ratios (SNR), or combinations of these or other performance metrics.

In order to compensate for at least some of the aforementioned variability, read channels can include many configurable operating parameters that can be tuned to influence the performance metrics (e.g., write pre-comp, analog filter parameters, Viterbi targets, asymmetry correction parameters, equalizer filter taps). One method that is used for configuring such parameters is a linear process, in which one set of parameters is tested to determine a setting that causes the performance metric to most closely approximate a desired result before testing the next set. Full joint optimization is another process that can be used to configure the parameters, in which the values of the parameters are exhaustively scanned to determine a combination of values that causes the performance metric to best approximate a desired result.

SUMMARY

The present disclosure includes systems and techniques relating to the use of evolutionary algorithms for tuning the performance of read channels. According to an aspect of the described systems and techniques, an apparatus includes a hardware processor and a medium encoding instructions. The instructions, when performed by the hardware processor causes a storage device to perform operations including obtaining values corresponding to operating parameters of a read channel of the storage device, generating one or more output parameters corresponding to use of the values with the read channel of the storage device, selecting a proper subset of the values based on the one or more output parameters and a cost function, creating a new generation of the values corresponding to the operating parameters of the read channel of the storage device based on the proper subset and repeating the generating and the selecting using the new generation of the values, until a target is achieved, and outputting two or more of the values of the proper subset of a last generation when the target is achieved to configure the read channel of the storage device.

According to another aspect of the described systems and techniques, a method includes obtaining values corresponding to operating parameters of a read channel of a storage device, generating one or more output parameters corresponding to use of the values by the read channel of the storage device, selecting a proper subset of the values based on the one or more output parameters and a cost function, and creating a new generation of the values corresponding to the operating parameters of the read channel of the storage device based on the proper subset, and repeating the generating and the selecting using the new generation of the values, until a target is achieved.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiment(s) below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

Thus, according to another aspect of the described systems and techniques, a system can include a hardware interface configured to provide values for operating parameters of a read channel of a storage device, and processing circuitry configured to effect a genetic algorithm to generate the values through a series of generations in which two or more proper subsets of values are selected as parents in a generation based on a cost function.

The described systems and techniques can result in identification of read channel configurations that cause a read channel to achieve a target performance. The configurations can cause target performances that can approximate the target performance more closely than do the configurations identified by conventional search methods.

Details of one or more implementations are set forth in the accompanying drawings and the description below. Other features, objects and advantages may be apparent from the description and drawings, and from the claims.

DRAWING DESCRIPTIONS

FIGS. 5A-5C are tables of information that show examples of inputs and outputs of an example of an orthogonal array testing process.

Like reference symbols in the various drawings indicate like elements.

DETAILED DESCRIPTION

The systems and techniques described herein can be implemented as one or more devices, such as one or more integrated circuit (IC) devices, in read channel circuits of various storage devices (e.g., magnetic data storage devices, optical data storage devices, flash storage devices, holographic storage devices). For example, the systems and techniques disclosed can be implemented in a hard disk drive suitable for use in a computer system.

Figure 1:
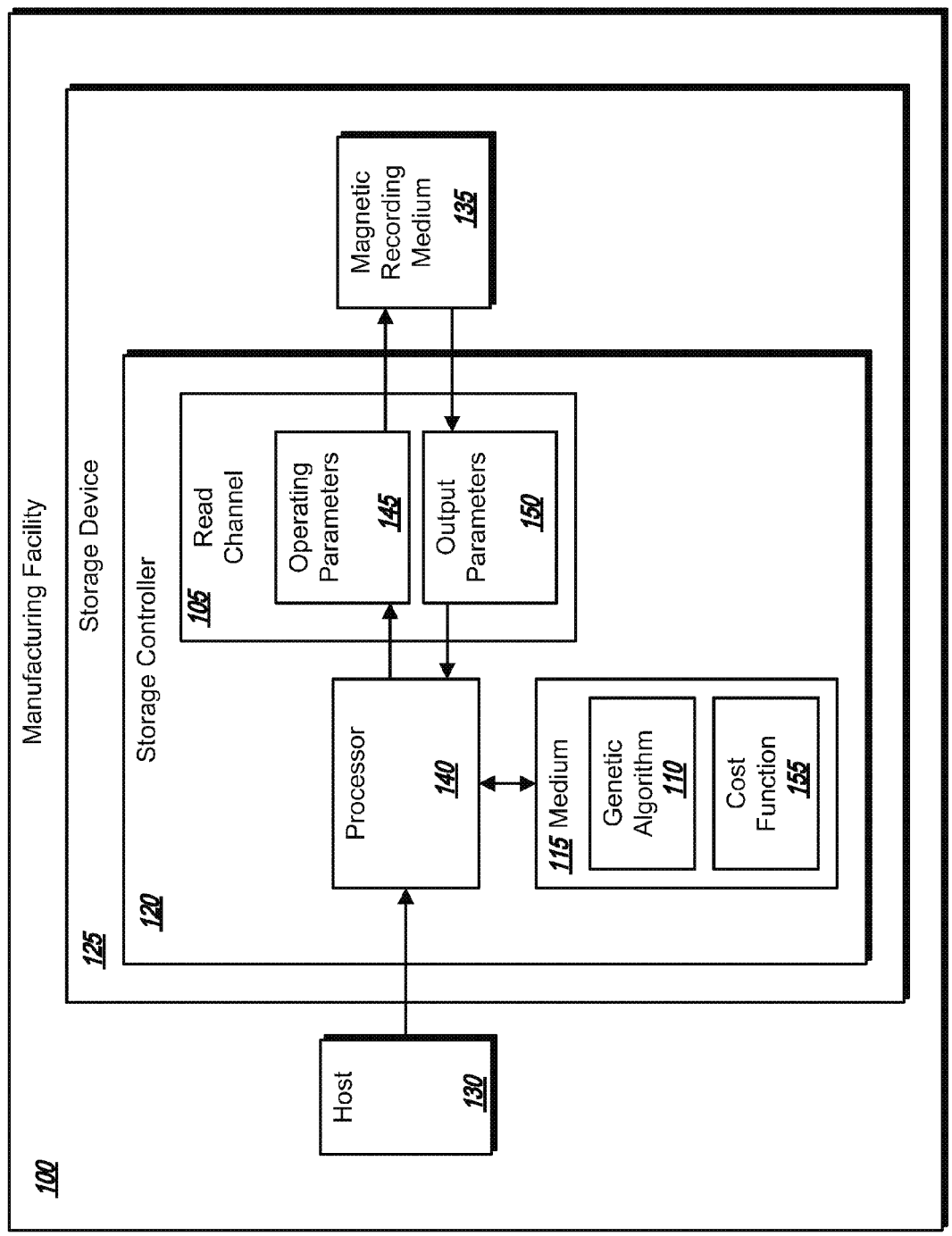
FIG. 1 is a block diagram showing an example of a manufacturing facility in which read channels of storage devices are configured using a genetic algorithm.

FIG. 1 is a block diagram showing an example of a manufacturing facility 100 in which read channels, such as a read channel module 105, are configured using a genetic algorithm 110. In general, a read channel implements various sophisticated algorithms and sub-modules, and each read channel sub-module and/or algorithm can have many configurable parameters that may be adjusted to tune the performance of the read channel (e.g., to optimize the read channel module's performance relative to a desired target such as a low bit error rate or high signal to noise ratio). The performance of the read channel module is generally best achieved when its respective sub-modules are working together in a favorable combination. This, however, is an optimization problem that is often challenging to solve considering the number of parameters present.

For example, in a magnetic read channel module, some commonly tuned parameters can include: write pre-comp parameters (e.g., 3 parameters, each 8 bits), analog filter parameters (e.g., 5 parameters, each 6 bits), Viterbi targets (e.g., 5 parameters, each 6 bits), asymmetry correction parameters (e.g., 2 parameters, each 8 bits), equalizer filter taps (e.g., 12 parameters, each 10 bits), and other parameters.

One technique that has been used to tune these parameters is a linear search process. In general, a linear search process can be performed by selecting and sweeping one parameter at a time to find an optimal setting (i.e., the setting that causes the read channel module to most closely approach a desired performance target) until each parameter has been adjusted individually. In some implementations, the cost metric can be the signal to noise ratio (SNR), the Viterbi margin metric, bit error rate (BER), sector failure, or combinations of these or any other appropriate measurements. For example, when all the possible values, or a subset, of a first parameter set have been tested, the values corresponding to the best cost metric are recorded to be used for the subsequent sweep of the next parameter sets. The procedure can be repeated for the next parameter set until all the parameter sets have been checked. The linear search process can produce usable parameters, but the parameters are generally considered to be sub-optimal solutions.

Another technique that is used is a full joint optimization process. In such a process, an algorithm exhaustively scans through all possible values of the parameter sets. While this approach is able to identify parameter settings that cause the read channel module's performance to approach a target value, this procedure can take too long to be practical or economical, such as in a manufacturing environment. For example, using the aforementioned collection of parameters, a total of $(2^{8*3})*(2^{5*6})*(2^{5*6})*(2^{2*8})*(2^{12*10})$ 9.4e58 experiments would be performed.

Referring again to FIG. 1, a genetic algorithm 110, stored in a medium 115 of a storage controller 120, is used to tune the read channel 105. The storage controller 120 is included in a storage device 125, and provides an interface between a host device 130 (e.g., a computer, a manufacturing test system) and a magnetic recording medium 135. In some implementations, the storage device 125 can be a magnetic storage device, such as a hard disk drive, floppy disk drive, or tape drive. In some implementations, however, the storage device 125 can be an optical drive, a flash memory system, a holographic storage system, or any other appropriate form of data storage and retrieval system. In such examples, the magnetic recording medium 135 may be replaced by optical, flash, holographic, or any other appropriate medium.

In the manufacturing facility 100, a processor 140 of the storage controller 120 obtains values corresponding to operating parameters of the read channel module 105. For example, the operating parameters can include write pre-comp parameters, analog filter parameters, Viterbi targets, asymmetry correction parameters, equalizer filter taps, and other parameters. In some implementations, the processor 140 may obtain the values by communicating with the read channel module 105. In some implementations, the processor 140 may obtain the values from the host device 130 (e.g., a manufacturing test system of the manufacturing facility 100). For example, the host device 130 may provide sets of parameter values that represent one or more possible configurations for each tunable parameter of the read channel module 105. In some implementations, the host device 130 may provide sets of parameter values that represent one or more known-good configurations. For example, the parameter sets can be collections of values that have been previously determined or expected to cause the read channel device's 105 performance to approach a target performance level.

The processor 140 retrieves and runs the genetic algorithm 110 from the medium 115. In some implementations, the medium 115 can be random access memory (RAM), flash memory, a hard drive, or any other appropriate data storage medium. The medium 115 can be the same as the medium 135, but in most cases, the medium 115 will be separate and more closely integrated with the processor 140, such as firmware. The processor 140 performs the genetic algorithm 110 to determine a population of operating parameters (e.g., a collection of collections of configuration values, a population of "chromosomes" in the parlance of genetic algorithms). Examples of genetic algorithms will be discussed in the descriptions corresponding to FIGS. 2, 3A-3C, 4, and 6A-6B.

The processor 140 identifies a selected member of the population, and performs a cost function 155 upon it. In general, the cost function 155 is used to rank the relative suitability of each set of operating parameters. The input to the cost function 155 is a selected set of operating parameters, and the output is the cost value. For example, the cost function can be the bit error rate, the sector failure rate, or a combination of these and any other appropriate measure of read channel performance that can be used to determine a cost value. In some implementations, the smaller the cost, the better the set of operating parameters (i.e., the fitter the chromosome).

The read channel 105 uses operating parameters 145 to access the magnetic recording medium 135. By accessing the magnetic recording medium 135, a collection of output parameters 150 is obtained. In some implementations, the output parameters 150 can include the bit error rate detected during the access, the signal to noise ratio detected during the access, or any other appropriate values that can be used to measure how well the read channel 105 can access the magnetic recording medium 135.

The processor 140 obtains the output parameters 150 from the read channel device 105. The cost function 155 is used to determine a performance score based on one or more of the output parameters 150. The processor 140 temporarily stores the performance score. In some examples, the cost function 155 may use the bit error rate as the cost function, but other cost functions could also be used, such as the Viterbi margin metric and sector failure rates. In some implementations, a programmable measurement length (e.g., 100 sectors) can be used to evaluate each cost function.

The processor 140 can repeat the process of selecting, testing, and scoring sets of operating parameters until the entire population of sets of operating parameters has been scored by the cost function 155. The processor 140 identifies two or more of the operating parameters (e.g., based on lowest determined cost function outputs) to act as parents to a next generation of operating parameters. In some implementations, the process of generating populations of operating parameters, testing, ranking, selecting parents, and generating subsequent generations of operating parameters may repeat until a target value is reached. For example, the process may repeat until the output of the cost function 155 falls within a predetermined tolerance range, such as a bit error rate less than about $1e^{-4}$. In another example, the process may repeat until the output of the cost function 155 stabilizes (e.g., the standard deviation of the best scores from generation to generation falls within a predetermined limit, the standard deviation of the scores from all the members of the last population falls within a predetermined standard deviation). In another example, the process may repeat until a predetermined number of generations (e.g., 10, 15, 20, 50, and 100) have been tested.

The processor 140 selects, based on the cost function 155, the best set of operating parameters of the most recent generation, and programs them into the read channel 105 as the operating parameters 145.

Figure 2:
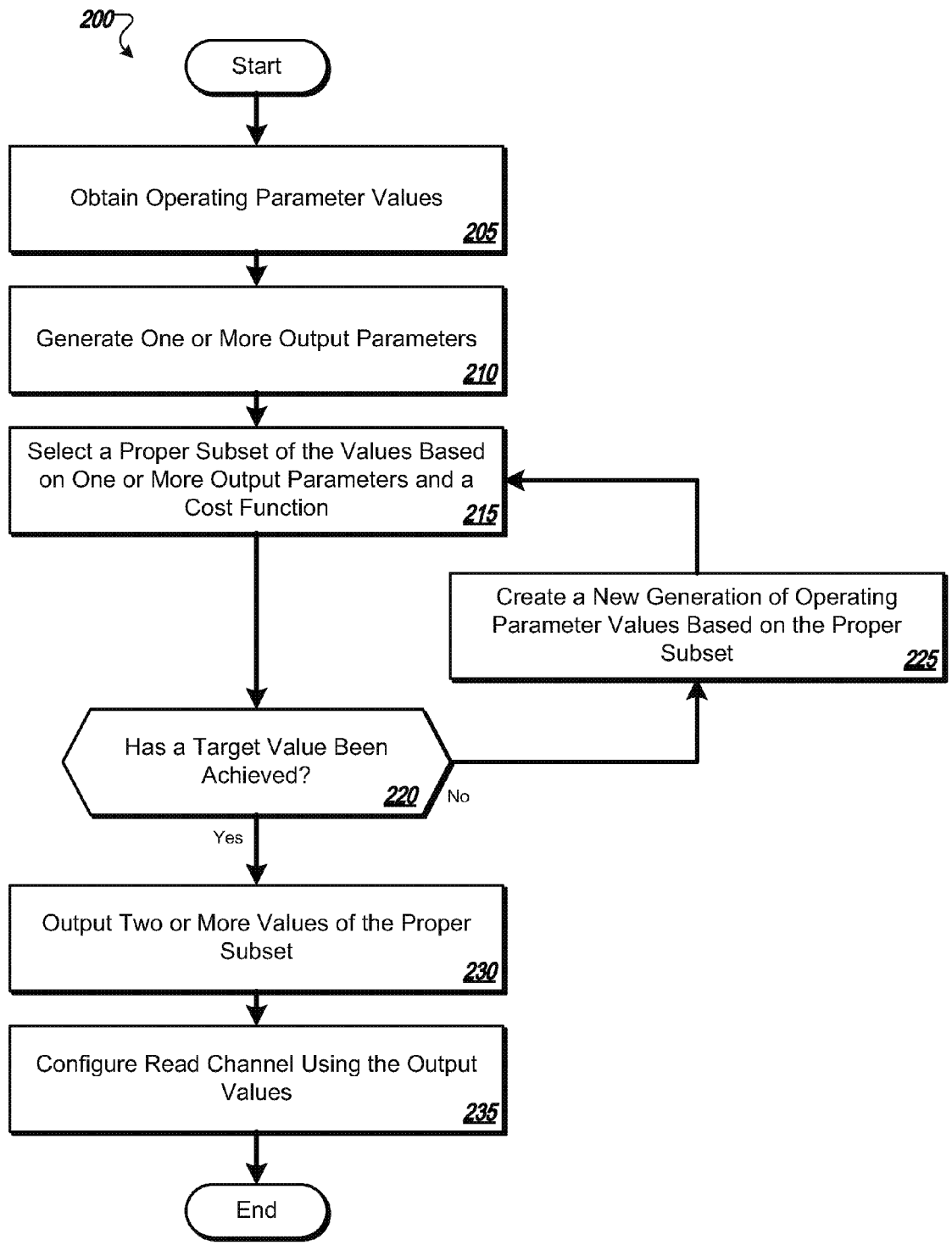
FIG. 2 is a flowchart showing an example of a process for identifying operating parameter values using a genetic algorithm.

FIG. 2 is a flowchart showing an example of a process 200 for identifying operating parameter values using a genetic algorithm. The process 200 is performed by a processing device. In some implementations, the processing device may be the storage controller 120 of the storage device 125 of FIG. 1. Evolutionary algorithms belong to a class of search algorithms that are population-based and use mechanisms inspired by biological evolution. One subclass of such algorithms is genetic algorithms. The "classic" algorithm is described in the book "Genetic Algorithms in Search, Optimization, and Machine Learning" by David E. Goldberg, Addison-Wiley Publishing Company, Inc., 1989. In some implementations, for optimization problems without a closed-form solution, genetic algorithms can identify better results in a shorter amount of time when compared to an exhaustive (e.g., full joint) or linear search.

At 205, operating parameter values of a read channel of a storage device are obtained. The operating parameter values identify one or more configuration values that may be assigned to respective operational parameters of a read channel module, such as write pre-comp parameters, analog filter parameters, Viterbi targets, asymmetry correction parameters, equalizer filter taps, and any other appropriate parameters that can be used to configure a read channel. In some implementations, the processor 140 may read operating parameter values from the medium 115 or the read channel module 105, or the operating values may be provided to the storage controller 120 by the host device 130. In some implementations, the processor 140 may create the output parameters based on the read channel, or on a simulation of a read channel. In some implementations, the operating parameters may be composed of randomly selected operating parameter values. In some implementations, the operating parameters may be composed of various predetermined (e.g., known-good) operating parameter values.

At 210, one or more output parameters are generated. For example, the read channel 105 can be configured with a selected set of operating parameters 145 to access the magnetic recording medium 135. The performance of the read channel 105 as configured by the operating parameters 145 is measured and quantified, and is returned as the output parameters 150 (e.g., bit error rate, Viterbi margin metric, sector failure rate).

At 215, a proper subset of the operating parameter values is selected, based on the one or more output parameters and a cost function. For example, the processor 140 may program the read channel module 105 with a predetermined number of configurations of operating parameters 145 to access the magnetic recording medium 135. The performance of the each operating parameter 145 as used by the read channel 105 is quantified by the output parameters 150, which are evaluated through the cost function 155. After all of the predetermined number of configurations of operating parameters have been programmed, tested, and scored using the output parameters 150 and the cost function 155, the processor 140 selects one, two, or more of the operating parameters based on their respective cost function scores (e.g., selecting the least costly operating parameters).

In some implementations, the proper subset of values may be selected in accordance with probabilities weighted by the cost function. For example, a portion of the operating parameters can be selected randomly to be used for the next generation, where operating parameters having output parameters associated with lower costs are more likely be selected as parents of the next generation than those with higher costs.

At 220, a determination is made as to whether a target value has been achieved. For example, the processor 140 may determine that the cost function of an output parameter is within a predetermined threshold target value (e.g., the bit error rate resulting from the use of a selected an output parameter is less than $1e^{-4}$). In another example, the processor 140 may determine at 220 that the cost functions of multiple output parameters or generations of parameters have converged upon a cost function value within a stability target value (e.g., a predetermined standard deviation target value). In other words, the target value may be achieved when little change or improvement has been seen, either within a generation, of across recent generations of solutions. In another example, the target value may be a timeout value, which if exceeded satisfies the determination at 220. In yet another example, the target value may be a maximum number of generations value, which if exceeded satisfies the determination at 220 (e.g., the determination may be satisfied when more than fifteen generations of operating parameters have been tested).

If the target value has not been achieved at 220, then at 225 a new generation of the values corresponding to the operating parameters of the read channel of the storage device based on the proper subset is created (e.g., by the processor 140). The creation of new generations of solutions based on previous solutions in the context of a genetic algorithm is discussed further in the examples of FIGS. 5A-5C.

In some implementations, the process of selecting the proper subsets of values may include using an array of orthogonal vectors. The orthogonal vectors may include elements corresponding to combinations of the operating parameters that are different and statistically independent from corresponding elements in all other orthogonal vectors in the array to approximate a full optimization. In some implementations, the vectors in the array can be processed and compared to determine correlating relationships among the operating parameters. Arrays of orthogonal vectors will be discussed further in the descriptions of FIGS. 5A-5C. The creation of the new generation may include randomly intercombining and altering the proper subset of the values to produce the new generation.

If the target value has been achieved at 220, then at 230 two or more of the values of the proper subset of a last generation are output. For example, the processor 140 may select the output parameter with the lowest cost function from among the most recently generated population of output parameters, and output operating parameter values identified by the selected output parameter.

In some implementations, input to affect the selectivity of the cost function may be received at a manufacturing facility. For example, the selectivity of the cost function 155 may be affected by inputs to the processor 140 received from the host device 130 (e.g., which may be in communication with and receive selectivity information from a manufacturing resource planning system or configuration requirements management system) of the manufacturing facility 100.

At 235, the two or more values output are used to configure the read channel of the storage device. For example, the processor 140 may program the two or more output values as the operating parameters 145 to configure the read channel module 105.

In some implementations, the process 200 may be performed in a manufacturing facility. For example, the process 200 may be performed by the storage controller 120 to operate the read channel module 105 of the storage device 125. In some implementations, the storage device includes a magnetic recording medium (e.g., the magnetic recording medium 135).

In some implementations, the processing device can include an embedded processor, and the generating at 210 and the selecting at 215 can be performed by compiled binary code executing on the embedded processor. For example the generating and selecting operations may be encoded as compiled computer code and executed by the processor 140 included in the storage controller 120. In some implementations, the processor 140 may be embedded in a computing device that is external to the storage controller 120. For example, the processor 140, the medium 115, including the genetic algorithm 110 and the cost function 155, and/or the read channel 105 may be external to the storage device 125. For example, the aforementioned components may be included in the host device 130. In such an example, the host device 130 may act as a manufacturing test and/or calibration station of the manufacturing facility 100. For example, the host 130 may be an in-circuit tester device configured to communicate with and configure the read channel device 105 during the manufacturing process.

Figure 3A:
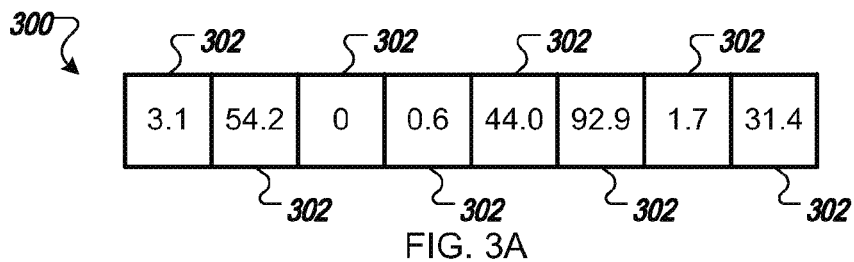
FIGS. 3A-3C are conceptual block diagrams showing elements of a genetic algorithm.
Figure 3B:
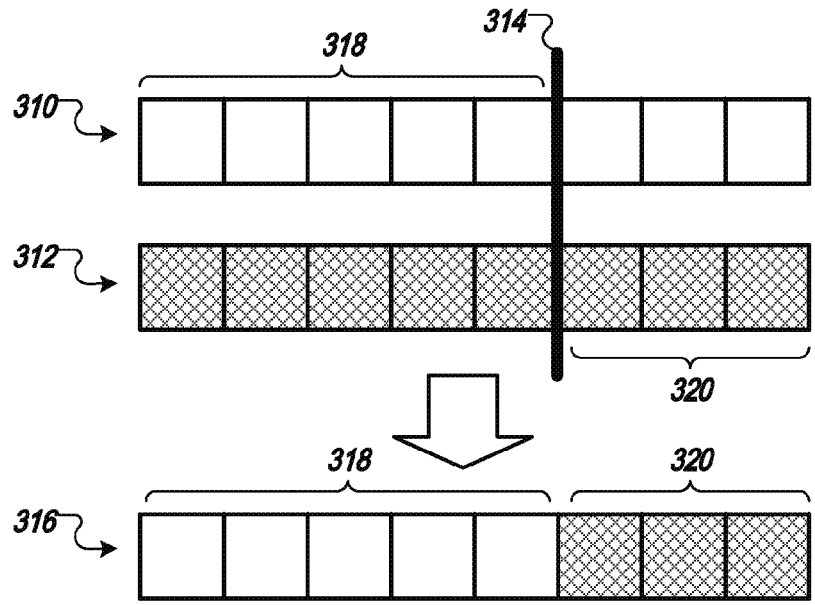
Figure 3C:
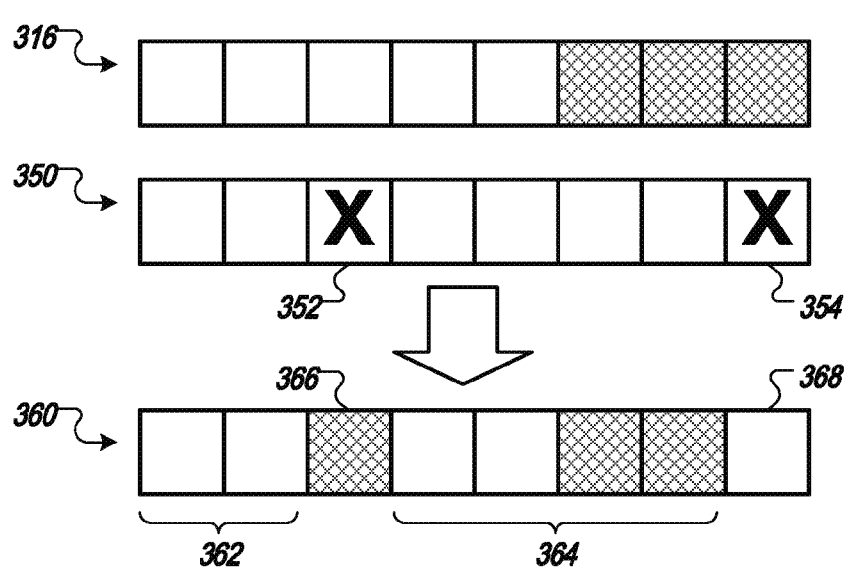

FIGS. 3A-3C are conceptual block diagrams showing elements of a genetic algorithm, such as the genetic algorithm 110 of FIG. 1. In general, genetic algorithms work by emulating some of the biological processes of genetic evolution. In nature, chromosomes include sequences of genes that describe how an organism is "built", and survival of the fittest dictates which genes will survive to propagate the next generation. Each subsequent generation is "built" according to a mix of sequences copied from surviving parents' genes, with an occasional mutation occurring that may give rise to a chromosome that is more fit than its parents or peers.

As a computational process, genetic algorithms generally operate to seek an "ideal" solution (e.g., a set of system input values that causes a system output value to approach a desired result). For optimization problems without a closed-form solution, genetic algorithms can provide better results in a shorter amount of time when compared to an exhaustive or linear search.

Referring now to FIG. 3A, a solution is represented as a chromosome 300. The chromosome 300 is an array of genes 302 that can be applied to a collection of corresponding operational inputs for a system. In the illustrated example, the genes 302 are real numbers (e.g., each gene 302 in the chromosome 300 is a decimal number), but in other implementations, the chromosome 300 can be a concatenated array of binary representations of values (e.g., each gene 302 is either a one or zero) in which sequences of the genes 302 can be decoded into input values. For example, eight binary genes may be decoded as an 8-bit integer value, or an 8-bit ASCII character. In another example, 32 binary genes may be decoded as a 32-bit signed integer, a 32-bit unsigned integer, or as a 32-bit floating-point number. In general, any binary-encoded value or values can be encoded as and decoded from a binary chromosome.

In use, a population of chromosomes is generated (e.g., 10, 100, 1000 chromosomes, or any other appropriate size population). In some implementations, the genes for the population of chromosomes can be chosen randomly (e.g., in an attempt to start with a large variety of solutions). In some implementations, the genes can be chosen from predetermined values (e.g., a solution may converge more quickly by starting with chromosomes that encode solutions that are expected to approximate an "ideal" solution).

Each chromosome in the population is evaluated. In some implementations, a chromosome may be evaluated by applying the solution encoded by the chromosome to a target system. For example, the chromosome 300 may be decoded by the processor 140 of FIG. 1 into a collection of output values. The processor 140 may program those output values into the read channel module 105 as the operating parameters 145. The resulting output parameters 150 may be applied to the cost function 155 to determine an overall score for the solution represented by the chromosome 300. In some implementations, a chromosome may be evaluated by applying the solution encoded by the chromosome to a simulated system that can return one or more values that can be used to score the overall suitability (e.g., fitness) of the solution.

After every chromosome in the population has been scored, two or more of the relatively best-scoring chromosomes are selected as parents to a new population of solutions. Referring now to FIG. 3B, a chromosome 310 and a chromosome 312 represent two chromosomes that have been selected as parents of a new generation of solutions. Offspring of the parent chromosomes 310 and 312 are created by identifying a crossover point 314 along the chromosomes 310 and 312. In some implementations, the crossover point 314 can be selected randomly, or may be selected according to a mathematical function (e.g., statistical probabilities). In some implementations, two or more crossover points may be identified.

A child chromosome is produced by selecting a parent chromosome and copying the selected parent's genes to corresponding genes in the child until the crossover point is reached, after which the second parent's genes are copied to corresponding genes in the child. In the illustrated example, the chromosome 310 is selected as the first parent, and the genes 318 are copied to the child chromosome 316. At the crossover point 314, the second parent is selected, and the genes 320 are copied to the child chromosome 316.

Just as genetic mutations can occur in nature, so too are they emulated in genetic algorithms. In nature, such mutations often lead to the death of an organism, thus limiting the propagation of such mutations. In some instances, however, a mutation provides an organism with a competitive advantage over its peer and/or parents, thus increasing the likelihood that that individual will survive and pass its genetic code on to future generations.

In genetic algorithms, mutations are emulated to increase variety among populations and reduce stagnation. For example, without mutation, a population may converge on a mathematical local (but not absolute) maxima or minima occurring within the output set. Mutation, however, causes occasional variability to appear among populations. In an example of a population that has become trapped in a local minima as an absolute minima is sought, a mutated offspring may result in a solution that escapes the local minima and thus survives to pass its mutation on to future generations that may further approach the absolute minima.

Referring now to FIG. 3C, the child chromosome 316 is being subjected to a mutation operation. A mutation mask 350 represents all the gene locations of the child chromosome 316. Within the mutation mask 350, a mutation location 352 and a mutation location 354 are identified. In some implementations, the locations and/or the frequency of mutations can be random. In some implementations, the locations and/or the frequency of mutations can be determined mathematically (e.g., statistically based, inversely dynamic based on degree of convergence of recent solutions).

The mutation mask 350 is applied to the child chromosome 316 to generate a mutant chromosome 360 by mutating genes at the mutation locations 352 and 354. In the illustrated example, the mutation operations toggle a gene between two stated (e.g., black and white). For example, the genes in a section 362 and a section 364 are unchanged from the child chromosome 316, but a gene 366 has been swapped from white to black, and a gene 368 has been swapped from black to white.

In some implementations, mutation operations may be operations other than swap or toggle operations. In some implementations in which individual genes represent selected values from a collection of discrete values, the mutation operation may cause the mutant gene's value to be randomly or otherwise replaced by any one of the corresponding discrete values associated with the gene. In some implementations in which individual genes represent a value selected from a continuous spectrum of values (e.g., a decimal value between 0.00 and 10.00), the mutation operation may cause the mutant gene's value to be randomly or otherwise replaced by a value taken from the spectrum of values.

The new population is evaluated. The new population generally includes the surviving parents in a form of elitism, in which the best members of the population are automatically copied to the next generation. This operation may be implemented to ensure that the current best solution is propagated to the next generation. Since such new generations include at least one parent solution, combinations of the parents, and possibly mutated combinations of the parents, the new population is likely to include solutions that are at least as good as the best solutions found previously.

The process generally described here for FIGS. 3A-3C may be iterated until converged (e.g., cost function is below a given threshold) or until a time-out (e.g., max number of generations allowed) is reached. The iterative nature of genetic algorithms is discussed further in the description of FIG. 4.

Figure 4:
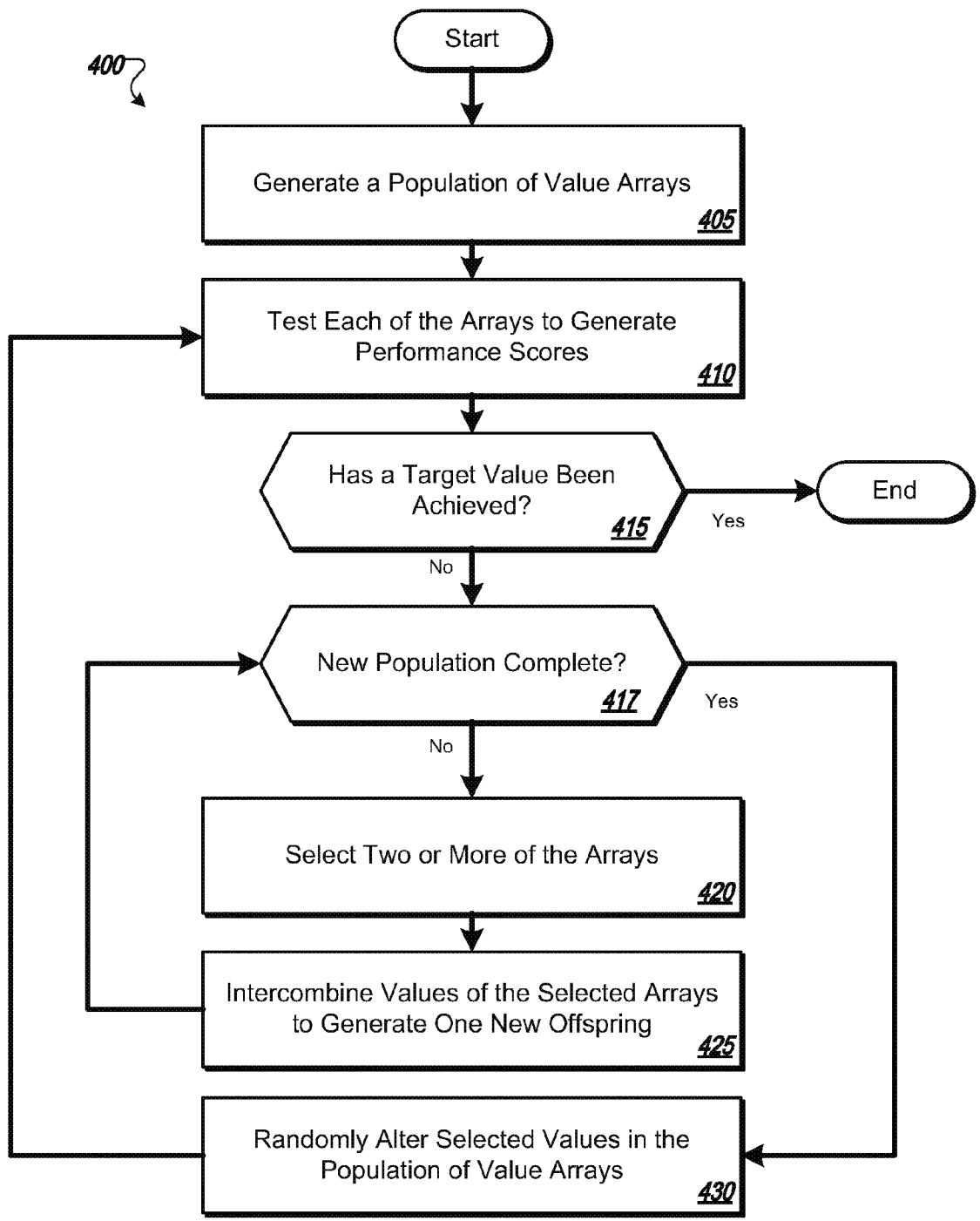
FIG. 4 is a flowchart showing an example of a genetic algorithm process.

FIG. 4 is a flowchart showing an example of a genetic algorithm process 400. In some implementations, the process 400 may be the genetic algorithm 110 performed by the processor 140 of FIG. 1.

At 405, a population of value arrays is generated. For example, the processor 140 can generate a collection of operating parameters. At 410, each of the arrays is tested to generate performance scores. For example, the operating parameters 145 can be programmed into the read channel module 105, and the resulting output parameters 150 can be evaluated through the cost function 155.

If at 415 a target value has been achieved, then the process 400 ends. If at 415 a target value has not been achieved, at 420 two or more of the arrays are selected. For example, if the cost function is a product of the bit error rate, then a solution that produced a bit error rate below a predetermined bit error rate limit is sought. If none of the population of value arrays produces a solution that satisfies the bit error rate limit, then the process continues. In other examples, the target value may be a predetermined maximum number of iterations, or may be a maximum standard deviation among converged solutions. If a satisfactory bit error rate is observed, a maximum number of iterations have been performed, or a standard deviation of converged solutions satisfies a threshold standard deviation, then the process 400 may end.

At 417, if a new population is not complete, then at 420, two or more of the arrays are selected. For example, the processor 140 may determine that a new population of arrays has fewer than a predetermined number of members (e.g., the population size), then the processor may begin the process of creating an additional new array by selecting two proper subsets of the operating parameters that have the two lowest corresponding cost function scores to be the parent chromosomes for the next generation of solutions.

In some implementations, a tournament selection process may be used to pick parents for the next generation of chromosomes. In general, tournament selection is a method of selecting an individual from a population of individuals in a genetic algorithm. Tournament selection involves running several "tournaments" among a few individuals chosen at random from the population. The winner of each tournament (e.g., the one with the best fitness) is selected for crossover. Selection pressure can be adjusted by changing the tournament size. If the tournament size is relatively large, weak individuals may have a smaller chance to be selected. For example, K different chromosomes can be picked from the population at random, and of the K chromosomes, the best can be selected as the reproduction candidate. In some implementations, this method can be attractive because it can provide the user with selectivity tuning. For example, the larger the value of K, the more selective tournament selection may be. In some implementations, the value of K may be between about 3 and about 12.

At 425, values of the selected arrays are intercombined to generate one new offspring value array. For example, the processor 140 may identify the crossover point 314 of FIG. 3B within the parent chromosomes 310 and 312, to produce the child chromosome 316 that includes gene sequences copied from both parents. The process continues at 417.

If at 417, the new population is determined to be complete, then at 430 selected values in the population of value arrays may be randomly altered. For example, the processor may randomly identify the mutation locations 352 and/or 354 where genes may be altered away from their copied values. The process 400 continues at 410, in which the new generation is tested to generate performance scores.

FIGS. 5A-5C are tables of information that show examples of inputs and outputs of an example of an orthogonal array testing process. Orthogonal arrays, also referred to as "Taguchi arrays", are tabular representations of collections of experimental values. FIG. 5A illustrates an example table 500 that includes three parameters 502 (e.g., variables, inputs) that are included in sets of operating parameters. Each of the parameters 502 can be assigned one of three levels 504-508 (e.g., discrete assignable values) apiece. For example, a set of operating parameters can include a parameter 520 that can be assigned a value of 2.2, 15.3, or 32.8, as well as a parameter 522 that can be assigned a value of 67.4, 75.3, or 99.2, as well as a parameter 524 that can be assigned a value of 0.2, 0.5, or 0.7.

Taguchi's design method is an engineering methodology for optimizing product and process conditions to make products with low development cost. In some implementations, experiments can be designed using matrices called orthogonal arrays for determining which combinations of factor levels to use.

Referring now to FIG. 5B, an orthogonal array 530 is illustrated. Each column of the array 530 represents a variable, and each row, such as a row 532, represents a vector array for an individual experiment (e.g., each row represents a collection of values that can be used to program the read channel device 105 of FIG. 1). A column 534 indicates the level 504-508 that is to be associated with the parameter 520. A column 536 indicates the level 504-508 that is to be associated with the parameter 522. A column 538 indicates the level 504-508 that is to be associated with the parameter 524. For example, the row 532 represents a test case in which the parameter 520 is set as "2.2", the parameter 536 is set as "75.3", and the parameter 524 is set as "0.5".

The array 530 is called orthogonal because all columns can be evaluated independently of one another. The orthogonal vectors include elements corresponding to combinations of the operating parameters that are different and statistically independent from all other orthogonal vectors in the array 530 to indicate relationships among the operating parameters to approximate a full optimization.

FIG. 5C illustrates an example of an array 550 in which the rows, such as the row 532, have been assigned the levels 504-508 according to the array 530. Each row represents a collection of values that can be used in an experiment, such as to program and evaluate the resulting performance of the read channel device 105. In some implementations, the rows of the array 550 may be used as a population in a hybrid genetic algorithm.

Figure 6A:
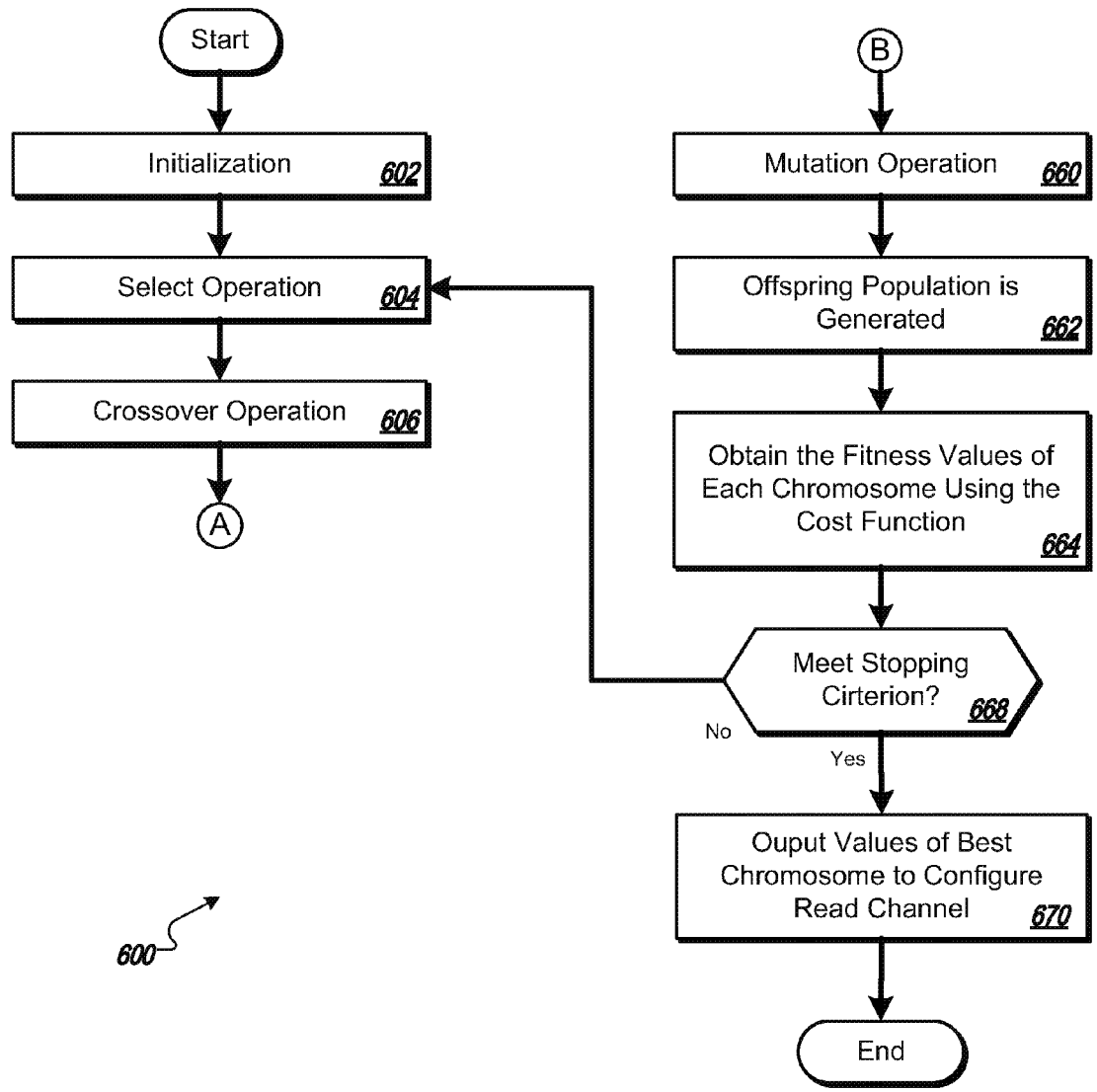
FIGS. 6A-6B is a flowchart showing an example of a hybrid genetic algorithm process.
Figure 6B:
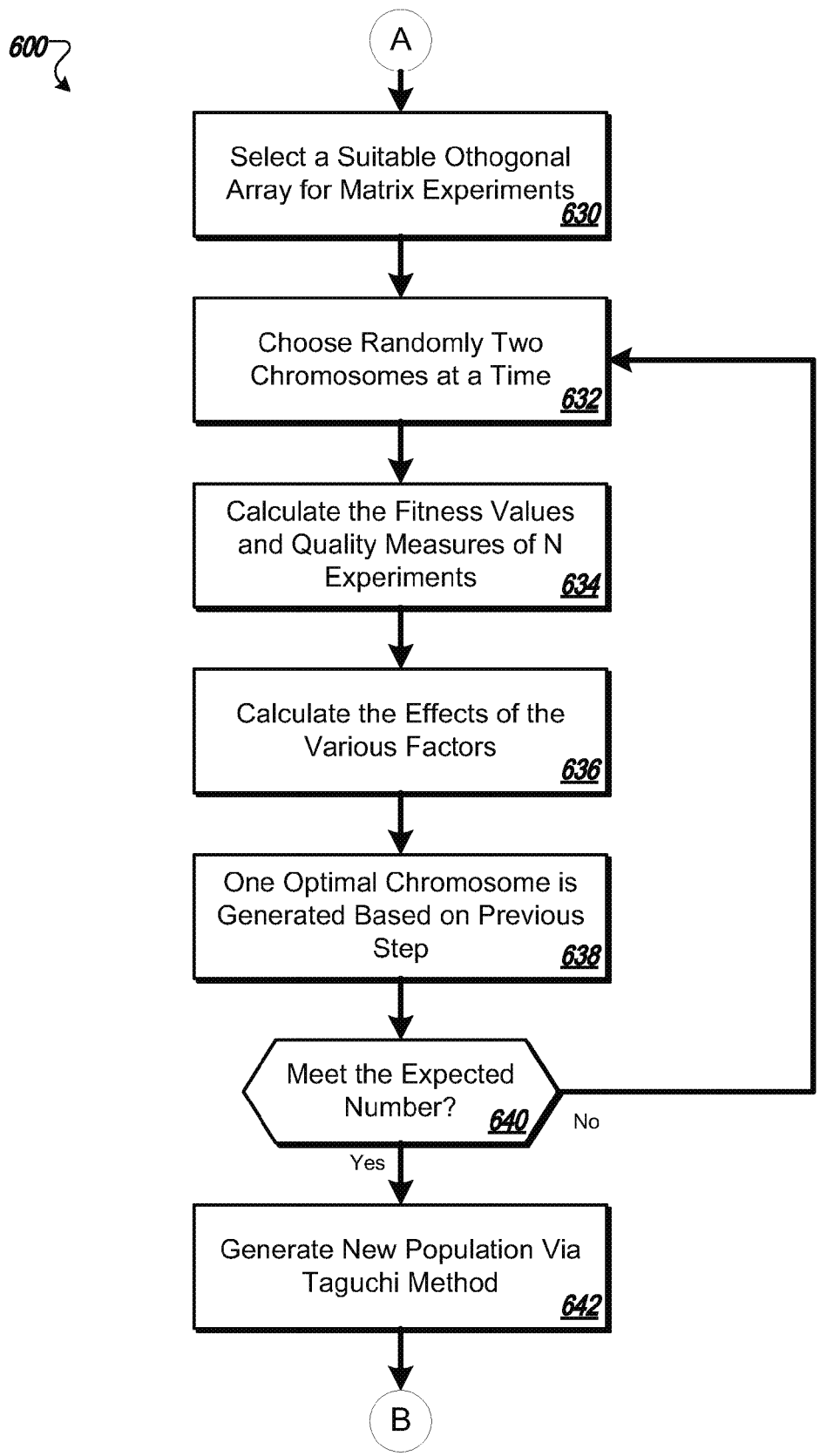

FIGS. 6A-6B is a flowchart showing an example of a hybrid genetic algorithm process 600. In some implementations, the process 600 can be the genetic algorithm 110 performed by the processor 140 of FIG. 1. The process 600 combines elements of a genetic algorithm with elements of Taguchi method. In some implementations, the hybrid genetic algorithm process 600 can improve on the classic genetic algorithm by improving coding techniques for continuous variables, by improving crossover operations with arithmetical operators, by using two tools of the Taguchi method (e.g., a two-level orthogonal array and a quality evaluation are employed to determine one fittest chromosome in an orthogonal array experiment), and/or by improving the mutation operator. An example of a hybrid genetic algorithm is described in "Hybrid Taguchi-Genetic Algorithm for Global Numerical Optimization", written by J. Tsai, et al., IEEE Trans on Evolutionary Computation, Vol. 8, no. 4, August 2004. Moreover, the various details of the hybrid genetic algorithm can be modified as described herein.

In general, elements of the Taguchi method are performed between the crossover and mutation operations of a genetic algorithm. Then, the systematic reasoning ability of the Taguchi method is incorporated in the crossover operations to select the better genes to achieve crossover, and can consequently enhance the genetic algorithm.

At 602, the algorithm is initialized. For example, the processor 140 may encode a population of chromosomes as vectors of floating-point numbers, with the same length as the vector of decision variables. For example, a system under test, such as a read channel, may have twenty decision, or input, variables that may be filled with floating-point numbers. In such an example, each chromosome may be a vector of twenty floating-point numbers that can be applied to the corresponding twenty decision variables of the system under test. In some implementations, the coding representation may be accurate and efficient because it may resemble the real design space, and, moreover, the string length may be the number of design variables. The function values of the population are calculated via a cost function (e.g., the cost function 155). The function values are then calculated M times, where M represents a predetermined population size.

In some implementations, binary substrings representing each variable with the desired precision can be concatenated to represent an individual. The resulting string, however, encoding a large number of design variables, may result in a large string length. For example, for 100 variables with a precision of six digits, the string length can be about 2000.

As illustrated in FIG. 5C, in some implementations a vector can be used as a chromosome to represent a solution to an optimization problem. In such examples, the initialization procedure at 602 can produce M chromosomes, where M denotes the population size. In some implementations, the use of vector representations may cause the process 600 to identify a suitable solution more quickly or with fewer computing resources than may be needed using binary representations. For example, instead of encoding each chromosome as a binary string, the variables may be kept as real numbers. So for a 10-tap finite impulse response (FIR) filter, rather than use an 80-bit vector (e.g., ten 8-bit values concatenated together), a vector of 10 variables can be used.

In some implementations, a random value $\beta$ may be generated, where $\beta$ is a value between 0 and 1. In some implementations, $\beta$ may be quantized to levels supported by the domain for $x_i$. $x_i$ can be expressed as $x_i = l_i + \beta(u_i - l_i)$, where $l_i$ and $u_i$ are the domain for $x_i$, and can be repeated N times to produce a vector $(x1, x2, \ldots, xN)$. This operation may be repeated M times to produce M initial chromosomes.

At 604, a selection operation is performed, for example, using the tournament selection method. For example, N different chromosomes may be picked from the population at random, and of the N chromosomes, the best chromosome may be selected as the reproduction candidate. In some implementations the tournament selection method may be attractive because it can provide the user with selectivity tuning. For example, the larger the value of N, the more selective tournament selection may be. In some implementations, the value of N can be between about 3 and 12. In some implementations, other selection methods such as a roulette wheel approach or a random selection method can be used. For example, in the roulette wheel approach, the fitness rank of each individual solution, rather than actual fitness scores, may be weighted to determine each solution's probability of being selected for reproduction.

At 606, a crossover operation is performed (e.g., the crossover operation illustrated in FIG. 3B). In some implementations, probability of crossover can be determined by a crossover rate given as $p_c$.

In some implementations, the crossover operation may scale the variable at the crossover point. For example, if the two parents are:

$$x = (x_1, x_2, \ldots, x_N)$$

$$y = (y_1, y_2, \ldots, y_N)$$

and the crossover point is at the k-th position, then the resulting offspring can be expressed as $$x' = (x_1, x_2, \ldots, x'_k, y_{k+1}, \ldots, y_N)$$

$$y' = (y_1, y_2, \ldots, y'_k, x_{k+1}, \ldots, x_N)$$

where $x'_k = x_k + \beta(y_k - x_k)$ and $y'_k = l_k + \beta(u_k - l_k)$.

At 630, a suitable two-level orthogonal array is selected for matrix experiments. For example, the array 530 of FIG. 5B is an $L_9$ orthogonal array that can accommodate up to four three-level factors. Other examples of selected orthogonal arrays can include $L_{32}(2^{31})$ for 30, and $L_{128}(2^{127})$ 100 2-level dimensions, respectively.

At 632, two or more chromosomes at a time are chosen randomly to perform matrix experiments. For example, the processor 140 may select two proper subsets of operating parameters at random. In the example of the 3-level factor table 530 illustrated in FIG. 5B, three chromosomes are randomly selected. At 634, the fitness (e.g., function) values and quality measures of the experiments are calculated in the orthogonal array $L_n(2^{n-1})$. For example, the processor 140 may apply the output parameters 150 to the cost function 155 to calculate performance scores for the selected operational values.

At 636, the effects of the various factors are calculated. In some implementations, the effects can be identified as $$E_{fl} = \text{sum of } \eta_i \text{ for factor } f \text{ at level } l \text{ in experiment } i$$

where $\eta$ is the quality measure, i is the experiment number, f is the factor name, and l is the level number. In some implementations, the quality measure $\eta$ can be given as $$\eta = (1/2) * \text{Sum}_i(1/y_i^2)$$

where $y_i$ is the cost of each chromosome in the population (e.g., y can be the cost function). The term $\eta$ can be introduced as a quality characteristic that reflects the amount of variation present in the data (e.g., the larger the value, the more favorable the situation may be).

For example, $y_A = \{5, 6, 7\}$, and $y_B = \{5, 6, 10\}$. For set A, $\eta_A = (1/25 + 1/36 + 1/49)/3 = 0.0294$. For set B, $\eta_B = (1/25 + 1/36 + 1/100)/3 = 0.0259$. Since $\eta_A > \eta_B$, set A may be identified as the better set.

At 638, one optimal chromosome is generated based on the calculations done at 636. For example, given 3 variables and a cost function of $$f(x) = (x_1 - 2)^2 + (x_2 - 3)^2 + (x_3 - 4)^2$$

and two chromosomes, $x_A = \{2.1, 3.1, 20\}$ and $x_B = \{20, 20, 4.1\}$. An "optimal" chromosome may be generated from these two. The two example chromosomes' cost functions may be $F(x_A) = 0.01 + 0.01 + 256 = 256.02$, and $F(x_B) = 324 + 289 + 0.01 = 613.01$. In this example, there are three variables, so according to Taguchi methods, four experiments may need to be conducted using the orthogonal array selected at 630.

Continuing the example:

Experiment 1 = {2.1, 3.1, 20}. Cost function = 256.02, $\eta = 1/256.022 = 1.5256e-5$ Experiment 2 = {2.1, 20, 4.1}. Cost function = 289.02, $\eta = 1.1971e-5$ Experiment 3 = {20, 3.1, 4.1}. Cost function = 324.02, $\eta = 9.5248e-6$ Experiment 4 = {20, 20, 20}. Cost function = 869, $\eta = 1.3242e-6$ For $x_1 = 20$, $\eta = (9.5248e-6 + 1.3242e-6)$ (i.e., add experiments 3 & 4). For $x_1 = 2.1$, $\eta = (1.5256e-5 + 1.1971e-5)$ (i.e., add experiments 1 & 2).

Since in this example, the second $\eta$ is larger, the value "2.1" may be selected for $x_1$. Continuing the example selection process for the remaining factors:

For $x_2 = 3.1$, $\eta = (1.5256e-5 + 9.5248e-6)$

For $x_2 = 20$, $\eta = (1.1971e-5 + 1.3242e-6)$

Since the first $\eta$ is larger, $x_2$ may be chosen as "3.1".

For $x_3 = 20$, $\eta = (1.5256e-5 + 1.3242e-6) = 1.658e-5$

For $x_3 = 4.1$, $\eta = (1.1971e-5 + 9.5248e-6) = 2.1496e-5$

Since the second $\eta$ is larger, $x_3$ can be selected as "4.1". Therefore, the new chromosome can be given as {2.1, 3.1, 4.1}.

At 640, a determination is made. If at 640, an expected number has not been met, then the process 600 continues at 632. In some implementations, the expected number may be given as $(1/2) * M * p_c$, where M denotes the population size and $p_c$ denotes the crossover rate.

If at 640, an expected number has been met, then at 642 a new population is generated using the Taguchi method. In some implementations, the expected number may be determined as $(1/2) * M * p_c$. In some implementations, the number of chromosome-generating function calls may be determined as $(1/2) * M * p_c * (n+1)$, where n+1 comes from n experimental runs of an orthogonal array $L_n(2^{n-1})$ plus one run for the optimum chromosome generated by SNRs.

Returning to FIG. 6A, at 660 a mutation operation is performed. In some implementations, the probability of mutation can be determined by a mutation rate $p_m$. In some mutation implementations, if the original chromosome is x = (x1, x2, ..., xi, xj, xk, ..., xN), and the elements xi and xk are randomly selected for mutation, then the resulting mutated chromosome can be given by x' = (x1, x2, ..., x'i, xj, x'k, ..., xN) where $x'i = (1-\beta) xi + \beta xk$, $x'k = \beta xi + (1-\beta) xk$.

At 662, an offspring population has been generated. At 664, the fitness value of each chromosome in the offspring population is obtained. For example, the processor 140 can program the read channel module 105 with the values encoded in the parents and the offspring population in order to obtain corresponding ones of the output parameters 150 for use with the cost function 155.

If at 668, a stopping criterion has not been met, then the process 600 continues at 604. In some implementations, the stopping criterion can be a predetermined performance threshold, a maximum number of iterations, a timeout, a convergence metric, or any other appropriate criterion that can be used to end a hybrid genetic algorithm.

If at 668, the stopping criterion has not been met, then at 670 the values of the best chromosome are output to configure the read channel. For example, the processor 140 can identify the best scoring proper subset of experimental operating parameters (e.g., based on the cost function 155), and program the selected parameters as the operating parameters 145 of the read channel module 105 for use when reading signals from and writing signals to the magnetic recording medium 135.

In some implementations, the genetic algorithm 110 or the hybrid genetic algorithm process 600 can be encoded in a script format. For example, in script format, the algorithms can be tested and debugged quickly and easily in an interactive fashion. In some implementations, the genetic algorithm 110 or the hybrid genetic algorithm process 600 can be encoded as compiled binary code. For example, the algorithm can be ported to run on an embedded CPU (e.g., as firmware executed by the processor 140). Compilation can provide very fast execution and can be used to quickly tune read channels. In some implementations, hooks in hardware (SOC) can provide ways to rapidly program hardware registers and can provide an efficient way to determine each chromosome's cost (e.g., BER, symER, VMM count).

Figure 7:
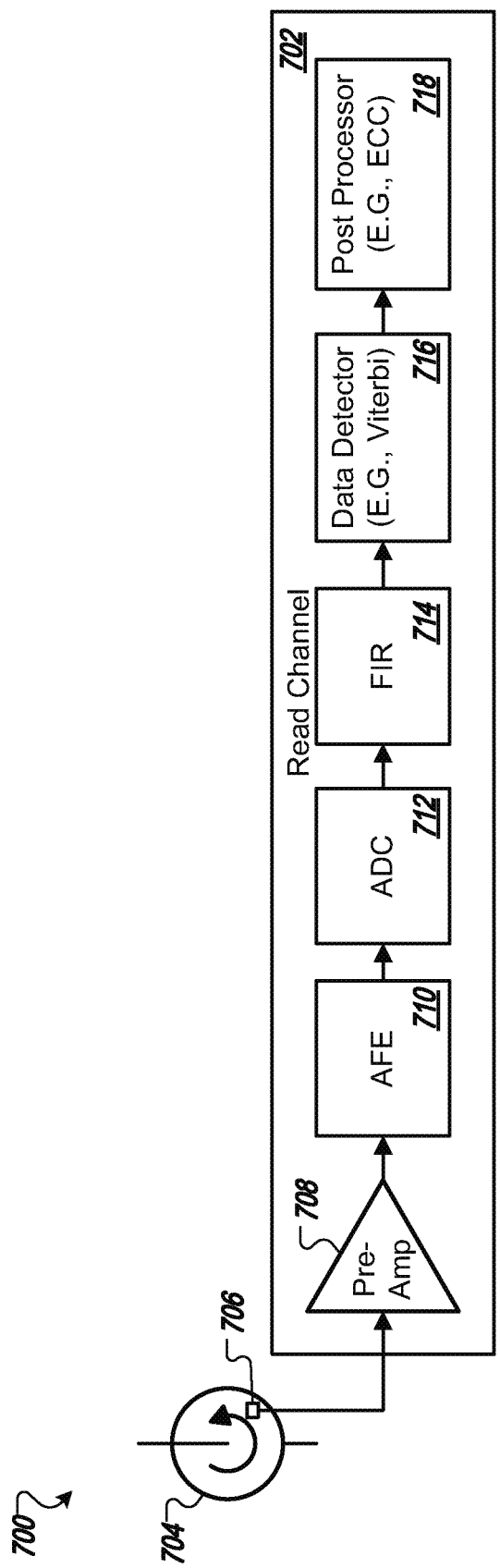
FIG. 7 is a block diagram of an example of a read channel of a storage device.

FIG. 7 is a block diagram of an example of a read channel module 702 in a storage device 700. In some implementations, the read channel module 702 can be the read channel module 105 of FIG. 1. The storage system 700 includes a storage medium 704 and read head 706. The storage medium 704 can be read-only or read/write media and can be magnetic-based, optical-based, semiconductor-based media, or a combination of these. Examples of the storage medium 704 include hard disk platters in a hard disk drive, a floppy disk, a tape, and an optical disk (e.g., laser disk, compact disk, digital versatile disk). The storage medium 706 is depicted in FIG. 7 as a disk for illustration only; the system and techniques described herein can be used with other storage media types or in non-storage applications (e.g., communications equipment).

The read head 706 can be part of a read-write head assembly that reads the storage media 704 under the control of an actuator (e.g., a servo). An analog read signal is generated and can be sent to a pre-amplifier 708. The system can include an analog front end (AFE) 710, which can provide filtering and gain control.

An analog to digital converter (ADC) 712 converts the read signal, and a signal equalizer 714 shapes the signal to a desired target. The ADC 712 can be a 6-bit ADC. The signal equalizer 714 can be a finite impulse response (FIR) digital filter, such as a 9-tap FIR, which can be programmable or adaptive. For example, the system can include an FIR adaptation unit that provides a control input to an FIR 714.

A data detector 716 interprets its input as discrete values stored on the media 704. In some implementations, the data detector 716 can be a Viterbi detector. The read channel 702 can combine partial-response equalization with maximum-likelihood sequence detection (PRML), using either a discrete time approach and/or a continuous-time approach (e.g., the class-IV partial response target (PR-IV)). The output of the data detector 716 is provided to a post processor 718, which can be error correction circuitry (ECC) used to identify and correct errors in a detected sequence.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
    obtaining values corresponding to operating parameters of a read channel of a storage device;

generating, by a processing device, one or more output parameters corresponding to use of the values by the read channel of the storage device;

selecting, by the processing device and using an array of orthogonal vectors, a proper subset of the values based on the one or more output parameters and a cost function; and creating a new generation of the values corresponding to the operating parameters of the read channel of the storage device based on the proper subset, by intercombining the proper subset of the values, altering the proper subset of the values, and repeating the generating and the selecting using the new generation of the values, until a target is achieved.

2. The method of claim 1, wherein the selecting comprises randomly selecting values in accordance with probabilities weighted by the cost function.

3. The method of claim 1, wherein the orthogonal vectors include elements corresponding to combinations of the operating parameters that are different and statistically independent from corresponding elements in all other orthogonal vectors in the array to approximate a full optimization, and the intercombining and altering of the proper subset of the values are performed randomly.

4. The method of claim 3, wherein the generating comprises operating the read channel of the storage device in a manufacturing facility for the storage device.

5. The method of claim 4, comprising receiving input at the manufacturing facility to affect selectivity of the cost function.

6. The method of claim 4, wherein the processing device comprises an embedded processor, and the generating and the selecting are performed by compiled binary code executing on the embedded processor.

7. The method of claim 4, wherein the storage device comprises a magnetic recording medium.

8. The method of claim 1, further comprising outputting two or more of the values of the proper subset of a last generation, when the target is achieved, to configure the read channel of the storage device.

9. A system comprising:
a hardware interface configured to provide values for operating parameters of a read channel of a storage device; and processing circuitry configured to effect a genetic algorithm to generate the values through a series of generations in which two or more proper subsets of values are selected as parents in a generation based on a cost function, and intercombine and alter the selected parents to produce each new generation, wherein the parents are selected using an array of orthogonal vectors.

10. The system of claim 9, wherein the processing circuitry is configured to select the parents randomly in accordance with probabilities weighted by the cost function.

11. The system of claim 9, wherein the orthogonal vectors include elements corresponding to combinations of the operating parameters that are different and statistically independent from corresponding elements in all other orthogonal vectors in the array to approximate a full optimization, and intercombining and altering of the selected parents are performed randomly.

12. The system of claim 11, wherein the processing circuitry is further configured to operate the read channel using the values in a manufacturing facility, and generate one or more output parameters of the storage device.

13. The system of claim 12, wherein the processing circuitry is configured to receive input at the manufacturing facility to affect selectivity of the cost function.

14. The system of claim 12, wherein the processing circuitry comprises an embedded processor for the storage device, a medium comprises firmware encoding instructions comprising compiled binary code that execute on the embedded processor.

15. The system of claim 12, wherein the storage device comprises a magnetic recording medium.

16. An apparatus comprising:
a hardware processor; and
a medium encoding instructions that when performed by the hardware processor causes a storage device to perform operations comprising:
obtaining values corresponding to operating parameters of a read channel of the storage device;
generating one or more output parameters corresponding to use of the values with the read channel of the storage device;
selecting, using an array of orthogonal vectors, a proper subset of the values based on the one or more output parameters and a cost function;
creating a new generation of the values corresponding to the operating parameters of the read channel of the storage device based on the proper subset, by intercombining the proper subset of the values, altering the proper subset of the values and repeating the generating and the selecting using the new generation of the values, until a target is achieved; and
outputting two or more of the values of the proper subset of a last generation, when the target is achieved, to configure the read channel of the storage device.

17. The apparatus of claim 16, wherein the selecting comprises randomly selecting values in accordance with probabilities weighted by the cost function.

18. The apparatus of claim 16, wherein the orthogonal vectors include elements corresponding to combinations of the operating parameters that are different and statistically independent from corresponding elements in all other orthogonal vectors in the orthogonal array to approximate a full optimization, and the intercombining and altering of the proper subset of the values generation are performed randomly.

19. The apparatus of claim 18, wherein the generating comprises operating the read channel of the storage device in a manufacturing facility for the storage device.

20. The apparatus of claim 19, comprising receiving input at the manufacturing facility to affect selectivity of the cost function.

21. The apparatus of claim 19, wherein the processing device comprises an embedded processor, and the generating and the selecting are performed by compiled binary code executing on the embedded processor.

22. The apparatus of claim 19, wherein the storage device comprises a magnetic recording medium.

* * * * *